United States Patent
Nakamura et al.

(10) Patent No.: US 12,296,498 B2
(45) Date of Patent: May 13, 2025

(54) UPPER BLADE ROLLER, SLITTING DEVICE, SLITTING METHOD, AND LAMINATED TAPE

(71) Applicant: DEXERIALS CORPORATION, Shimotsuke (JP)

(72) Inventors: Hiroyuki Nakamura, Utsunomiya (JP); Yoshikatsu Kodaira, Kanuma (JP); Tomohisa Kawai, Kawachi-gun (JP)

(73) Assignee: DEXERIALS CORPORATION, Shimotsuke (JP)

( * ) Notice: Subject to any disclaimer, the term of this patent is extended or adjusted under 35 U.S.C. 154(b) by 606 days.

(21) Appl. No.: 17/599,125

(22) PCT Filed: Mar. 31, 2020

(86) PCT No.: PCT/JP2020/014953
§ 371 (c)(1),
(2) Date: Sep. 28, 2021

(87) PCT Pub. No.: WO2020/204050
PCT Pub. Date: Oct. 8, 2020

(65) Prior Publication Data
US 2022/0168916 A1 Jun. 2, 2022

(30) Foreign Application Priority Data

Mar. 31, 2019 (JP) .................. 2019-069546
Mar. 31, 2020 (JP) .................. 2020-064981

(51) Int. Cl.
*B26D 1/24* (2006.01)
*C09J 7/00* (2018.01)

(52) U.S. Cl.
CPC ............... *B26D 1/245* (2013.01); *C09J 7/00* (2013.01); *C09J 2203/37* (2020.08); *C09J 2433/00* (2013.01); *C09J 2467/006* (2013.01)

(58) Field of Classification Search
CPC .............. Y10T 83/9377; Y10T 83/7747; Y10T 83/783; Y10T 83/9461; B26D 1/24;
(Continued)

(56) References Cited

U.S. PATENT DOCUMENTS

| 570,226 A | * | 10/1896 | McAdams | ............... | B41G 3/00 33/37 |
| 1,525,590 A | * | 2/1925 | Perrault | ................. | B26D 1/245 83/501 |

(Continued)

FOREIGN PATENT DOCUMENTS

| JP | 2001-30191 A | 2/2001 |
| JP | 2005-126623 A | 5/2005 |

(Continued)

OTHER PUBLICATIONS

Jul. 20, 2022 Office Action issued in Chinese Patent Application No. 202080026367.4.
(Continued)

*Primary Examiner* — Evan H MacFarlane
*Assistant Examiner* — Fernando A Ayala
(74) *Attorney, Agent, or Firm* — Oliff PLC

(57) ABSTRACT

A laminated film including an adhesive layer peelably laminated on a base film is shear cut using an upper roller including specific upper blades arranged at a pitch of 0.5 mm or less for slitting. The upper blade includes one side surface constituting a blade edge being a flat surface and the other side surface having a first ridge and a second ridge from the blade edge aide. A laminated tape including an adhesive layer peelably laminated on a base film is slit by slitting using this upper blade to a tape width of 0.5 mm or less without the base film and the adhesive layer peeling apart and with suppressed protrusion of the adhesive layer in the slit tape.

5 Claims, 8 Drawing Sheets

(58) Field of Classification Search
CPC .......... B26D 1/245; B26D 1/25; B26D 1/141; B26D 7/7261
See application file for complete search history.

(56) References Cited

U.S. PATENT DOCUMENTS

| | | | | | |
|---|---|---|---|---|---|
| 2,055,738 | A | * | 9/1936 | Venrick | B26D 1/0006 264/156 |
| 2,472,876 | A | * | 6/1949 | Ahrndt | B26D 1/0006 D15/127 |
| 2,836,889 | A | * | 6/1958 | Koch | B26B 9/00 83/676 |
| 3,253,494 | A | * | 5/1966 | Karr | B26D 7/2621 403/362 |
| 3,677,122 | A | * | 7/1972 | Rautine | B23D 19/06 83/347 |
| 3,894,461 | A | * | 7/1975 | Jakob | B26D 7/2621 83/665 |
| 4,279,957 | A | * | 7/1981 | Hiraoka | B32B 1/08 428/424.2 |
| 5,866,475 | A | * | 2/1999 | Yanagida | H01L 24/03 438/126 |
| 6,254,244 | B1 | * | 7/2001 | Ukai | H01J 61/52 362/240 |
| 6,427,572 | B2 | * | 8/2002 | Ciani | B26D 1/0006 83/675 |
| 7,350,387 | B1 | * | 4/2008 | Lisk | B21D 31/046 83/425.3 |
| 7,455,004 | B2 | * | 11/2008 | Li | B26D 1/0006 83/676 |
| 11,034,120 | B1 | * | 6/2021 | Goodrich | B31D 3/04 |
| 2001/0011574 | A1 | * | 8/2001 | Onishi | B26D 11/00 428/343 |
| 2002/0001688 | A1 | * | 1/2002 | Ueda | H01L 21/6835 257/E21.503 |
| 2011/0239840 | A1 | * | 10/2011 | Ohyabu | B26D 1/225 83/505 |
| 2011/0253826 | A1 | * | 10/2011 | Felisari | C21D 9/18 241/291 |
| 2012/0193057 | A1 | * | 8/2012 | Ohyabu | B26D 1/245 162/283 |
| 2013/0087029 | A1 | * | 4/2013 | Iyatani | B26D 7/1863 83/13 |
| 2018/0194028 | A1 | * | 7/2018 | Motta | B65H 35/02 |

FOREIGN PATENT DOCUMENTS

| | | | |
|---|---|---|---|
| JP | 2007-090461 A | 4/2007 | |
| JP | 2009-136930 A | 6/2009 | |
| JP | 2011-46840 A | 3/2011 | |
| JP | 2012-232392 A | 11/2012 | |
| JP | WO2017199781 A1 * | 5/2017 | .............. C09J 7/403 |
| JP | 2017-137188 A | 8/2017 | |
| JP | 6420511 B1 | 11/2018 | |
| WO | WO2004080670 A1 * | 10/2014 | ............... B26D 1/24 |
| WO | WO2015164901 A1 * | 11/2015 | ............... B26D 1/00 |
| WO | 2018/074318 A1 | 4/2018 | |

OTHER PUBLICATIONS

Sep. 14, 2023 Office Action issued in Taiwanese Patent Application No. 109111089.
Jan. 9, 2023 Office Action issued in Korean Patent Application No. 10-2021-7030560.
Nov. 27, 2023 Office Action issued in Korean Patent Application No. 10-2021-7030560.
Dec. 19, 2023 Office Action issued in Japanese Patent Application No. 2020-064981.
Jun. 22, 2023 Office Action issued in Chinese Patent Application No. 202080026367.4.
Jul. 7, 2023 Office Action issued in Republic of Korea Patent Application No. 10-2021-7030560.
Jun. 9, 2020 International Search Report issued in International Patent Application No. PCT/JP2020/014953.
Jun. 9, 2020 Written Opinion of the International Searching Authority issued in International Patent Application No. PCT/JP2020/014953.
Apr. 13, 2021 Written Opinion of the International Preliminary Examining Authority issued in International Patent Application No. PCT/JP2020/014953.
Jul. 30, 2021 International Preliminary Report on Patentability issued in International Patent Application No. PCT/JP2020/014953.
May 14, 2024 Office Action issued in Japanese Patent Application No. 2020-064981.
Nov. 21, 2024 Office Action issued in Taiwanese Patent Application No. 113137868.
Feb. 10, 2025 Office Action issued in Korean Patent Application No. 10-2024-7013907.

* cited by examiner

UPPER BLADE ROLLER, SLITTING DEVICE, SLITTING METHOD, AND LAMINATED TAPE

TECHNICAL FIELD

The present invention relates to an upper blade roller suited to slitting a laminated film including an adhesive layer peelably laminated on a base film, a slitting device using the upper blade roller, a slitting method, and a laminated tape obtained by slitting the laminated film.

BACKGROUND ART

Long laminated tapes including an adhesive layer peelably laminated on a base film have been used as transfer ribbons for transferring patterns, letters, and the like to an article, etc. (Patent Literature 1). Such laminated tapes are manufactured by slitting a laminated film including an adhesive layer peelably laminated on a base film.

Long laminated tapes including an adhesive layer peelably laminated on a base film have also been used as adhesive members to mount electronic parts on a substrate, and there has been a demand for narrow laminated tapes in recent years. However, slitting a laminated film including an adhesive layer peelably laminated on a base film to a narrow width causes a problem in that the base film and the adhesive layer peel apart due to the slitting. As a countermeasure against this problem, there is a large-scale method including using a flat blade as an upper blade in shear cutting using disk-shaped upper and lower blades and covering the entire device that slits the laminated film with a hood to suppress temperature variations from when the laminated film is slit to when it is wound up (Patent Literature 2). According to this method, the laminated film can be slit to a tape width as small as 0.5 mm to 4 mm.

One method for slitting a film by shear cutting is using cone blades as upper blades (Patent Literature 3). In the case of using cone blades, as shown in FIG. 9, slitting is performed with a side pressure F applied to upper blades 11 for improved cutting performance. Although the upper blades 11 are pressed against lower blades 21, reduced contact pressure between the upper blades 11 and lower blades 21 can extend the blade life. According to Patent Literature 3, a magnetic tape can be slit to a width of ⅛ inches.

CITATION LIST

Patent Literature

Patent Literature 1: Japanese Patent Application Laid-Open No. 2012-232392
Patent Literature 2: Japanese Patent Application Laid-Open No. 2007-90461
Patent Literature 3: Japanese Patent Application Laid-Open No. 2001-30191

SUMMARY OF INVENTION

Technical Problem

With cone blades however, high machining precision is difficult to achieve. Shear cutting using cone blades can only slit a film to a tape width as small as 0.7 mm at best, and slitting a film to a tape width of 0.5 mm or less has not been possible.

On the other hand, according to the method described in Patent Literature 2, the laminated film can be slit into narrow tapes having a width as small as 0.5 mm. However, no detailed discussion has been made with regard to slitting into narrow, long tapes having a width as small as 0.5 mm or less. Moreover, the problem of the base and the adhesive layer peeling apart, discussed in Patent Literature 2, becomes more likely to occur as the film width decreases. There are therefore concerns about a drop in non-defective rate and the like with narrow tapes having a width of 0.5 mm or less.

As shown in FIG. 7, when slitting a film 3 by shear cutting using flat blades, the film 3 is first pushed in to form a shear drop by blade edges 11a. The blade edges 11a are further pressed in to cut the film 3 by shearing, and further pressed in to break and cut the film 3 into tapes 4. If the film 3 is a laminated film 30 including an adhesive layer 32 laminated on a base film 31, the tapes 4 being cut are bent to extend on the ridge 11b sides. When unbent after that, the base film 31 can then form a bump 36 at a tape end 4p previously positioned on the ridge 11b side as shown in FIG. 8. When the laminated film 30 is slit into narrower tapes, the bump 36 will be greater in size. When such a tape is formed into a wound body, there occurs a problem that the effect of the bump is added up on one end of the wound body and the flatness of the tape is impaired. There is also a concern that the adhesive layer can protrude from the wound body to cause blocking.

In view of this, an object of the present invention is to enable slitting of a laminated film including an adhesive layer peelably laminated on a base film to a tape width of 0.5 mmm or less with clear cut sections, suppress the formation of a bump of the base film of the slit laminated tape, prevent the base film and the adhesive layer from peeling apart, and prevent the protrusion of the adhesive layer from the wound body.

Solution to Problem

The present inventors have conceived that slitting a film by shear cutting with flat upper blades with each having two ridges on one side can ensure machining precision in slitting the film to a width as small as 0.5 mm or less, improves cutting performance, and suppresses formation of a bump on an end of a slit tape, and warping of the upper blades can ease contact pressure between the upper blades and lower blades and extend the life of the upper blades as compared to cone blades. With these conception, the present inventors achieved the present invention.

More specifically, the present invention provides an upper blade roller including a plurality of disk-shaped upper blades arranged at a predetermined pitch. In this upper blade roller, one of side surfaces constituting a blade edge of each of the upper blades is a flat surface, the other side surface has a first ridge and a second ridge in order from the blade edge side, and the pitch of the upper blades is 0.5 mm or less.

The present invention also provides a slitting device including the foregoing upper blade roller and a lower blade roller including lower blades arranged at the predetermined pitch to correspond to the upper blades of the upper blade roller, the slitting device being configured to slit a film to a width of 0.5 mm or less by shear cutting.

The present invention further provides a slitting method for slitting a laminated film including an adhesive layer peelably laminated on a base film into a laminated tape having a tape width of 0.5 mm or less by shear cutting using the foregoing upper blade roller and a lower blade roller including lower blades arranged at the predetermined pitch to correspond to the upper blades of the upper blade roller.

In addition, the present invention provides a laminated tape including an adhesive layer peelably laminated on a base film, the laminated tape having a tape width of 0.5 mm or less, wherein if a bump of the base film is formed at one end in a widthwise direction of the tape, a width of the bump in a tape width direction is 7% or less of the tape width.

Advantageous Effects of Invention

If a film is slit by shear cutting using the upper blade roller according to the present invention, the film can be slit to a width of 0.5 mm or less, or a width of less than 0.5 mm in particular. In addition, the life of the flat upper blades can be extended compared to the case of using conventional cone blades having a slit width of 0.7 mm or more.

If a laminated film including an adhesive layer peelably laminated on a base film is slit to obtain laminated tapes, the formation of a bump of the base film at the tape ends located on the ridge sides of the upper blades can be suppressed. If such a tape is formed into a wound body, impairment of the flatness of the tape due to accumulation of bumps on one side of the wound body can be prevented. Protrusion and blocking of the adhesive layer of the wound body can also be prevented.

The laminated tape is therefore useful as a narrow pressure-sensitive adhesive member for attaching the adhesive layer to an article, and is also useful as an adhesive member if the adhesive layer is formed of a curable resin composition.

DESCRIPTION OF EMBODIMENTS

Figure 1:
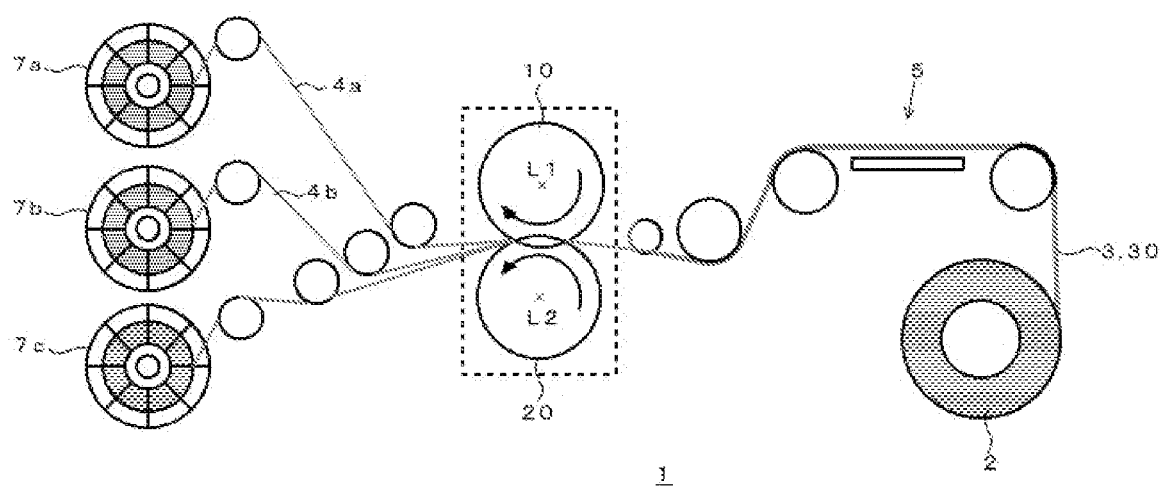
FIG. 1 is a schematic perspective view of a slitting device according to an embodiment.

The present invention will be described in detail below with reference to the drawings. In the drawings, the same reference numerals denote the same or equivalent components.

<Overall Configuration of Slitting Device>

FIG. 1 is a schematic configuration diagram of a slitting device 1 according to an embodiment of the present invention.

Figure 3:
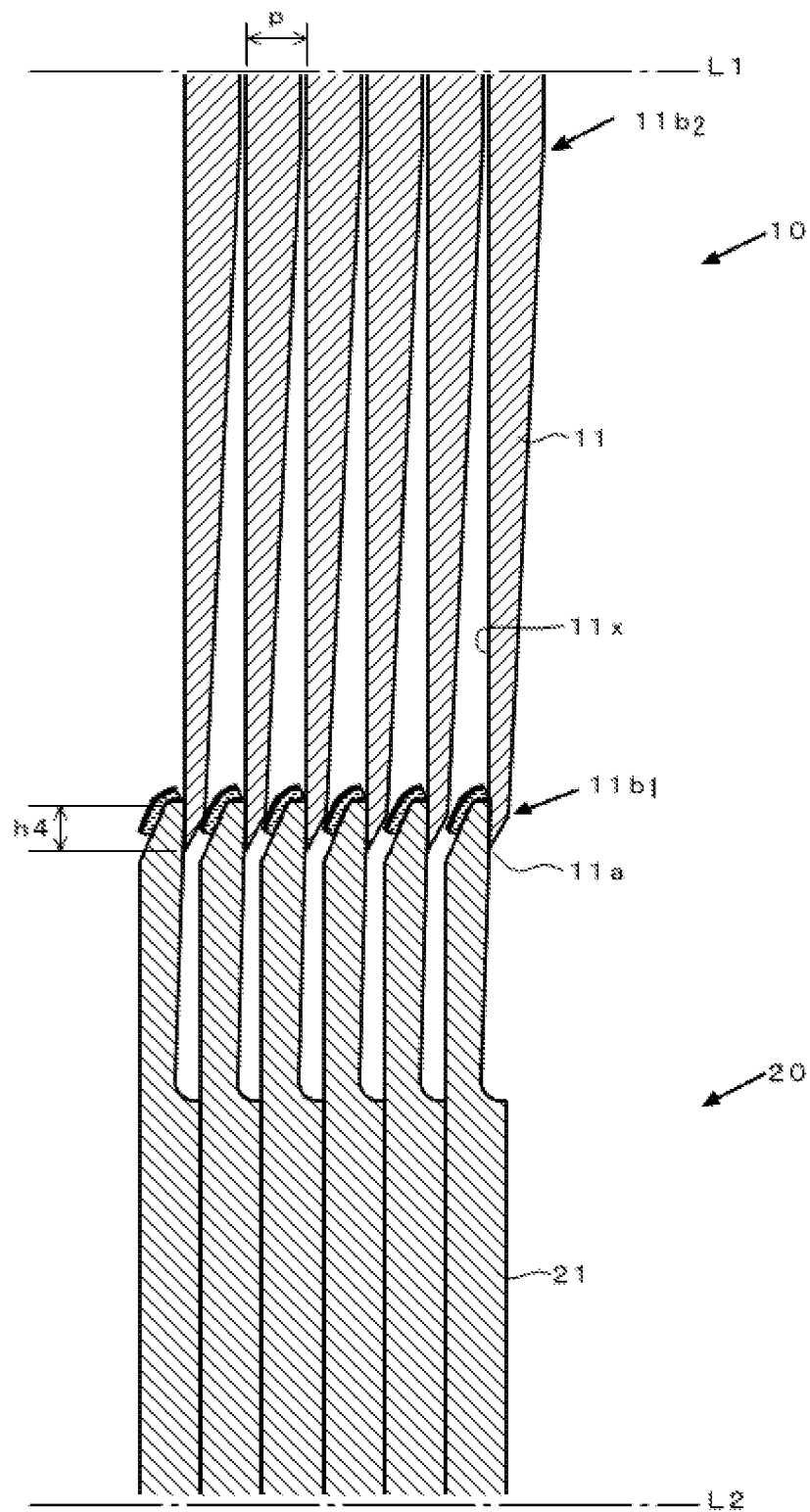
FIG. 3 is a cross-sectional view of blade edge portions of an upper blade roller and a lower blade roller of the slitting device according to the embodiment slitting a film.

As shown in FIG. 3, the slitting device 1 is a device that slits a film 3 by shear cutting and includes an upper blade roller 10 including a plurality of disk-shaped upper blades 11 arranged on a cylindrical roller at a predetermined pitch p in the direction of a rotation axis L1 of the roller and a lower blade roller 20 including lower blades 21 arranged at the predetermined pitch to correspond to the upper blades 11 of the upper blade roller 10.

Figure 2:
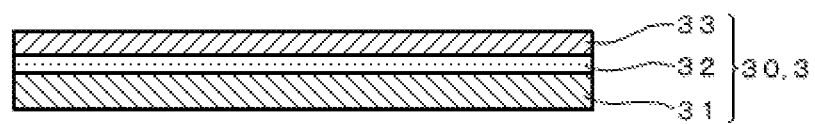
FIG. 2 is a cross-sectional view of a laminated film that can be slit by the slitting device according to the embodiment.

This slitting device 1 can slit various types of films 3. Examples of the films 3 may include a laminated film 30 where, as shown in FIG. 2, an adhesive layer 32 is peelably laminated on a base film 31 and a cover film 33 is peelably laminated on the adhesive layer 32.

The slitting device 1 includes a film unwinding device 2 as a conveyance mechanism for passing the film 3 between the upper blade roller 10 and the lower blade roller 20, and winding devices for winding up tapes obtained by slitting the film 3. The winding devices can include a winding device 7a for winding up even-numbered rows of tapes 4a, a winding device 7b for winding up odd-numbered rows of tapes 4b, and a winding device 7c for winding up film fringes so that a plurality of adjoining rows of tapes obtained by slitting the film are wound up in different directions. Note that the positional relationship among the winding device 7a for winding up the even-numbered rows of tapes 4a, the winding device 7b for winding up the odd-numbered rows of tapes 4b, and the winding device 7c for winding up the film fringes is not limited to the aspect shown in FIG. 1.

The slitting device 1 may also include a splicing unit 5 for joining and switching films 3 before the film 3 is passed between the upper blade roller 10 and the lower blade roller 20. Specifically, the splicing unit 5 joins films 3 together for film extension, or joins a conveyance film to the film 3 to reduce man-hours needed to switch films 3. To prevent contamination during slitting, a cover film may be provided for slitting. The cover film may be removed before or after slitting.

As will be described below, the slitting device 1 can slit the film 3 to a width of 0.5 mm or less, or a width of less than 0.5 mm in particular, not only when the film 3 to be slit is a single-layer resin film or a laminated film including a plurality of resin layers bonded or welded, but also when the film 3 is a laminated film 30 including an adhesive layer peelably laminated on a base film.

<Upper Blades>

Figure 4A:
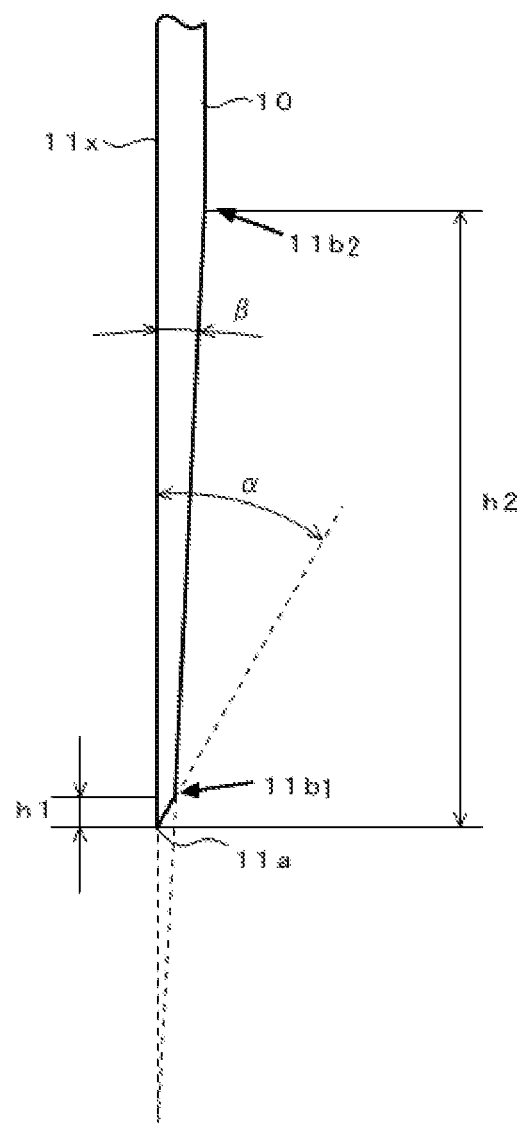
FIG. 4A is an enlarged plan view of the blade edge portion of an upper blade according to the embodiment.

As shown in FIG. 3, the disk-shaped upper blades 11 arranged on the upper blade roller 10 are a flat blade each, where one of the side surfaces constituting the blade edge 11a is a flat surface 11x that is flat and perpendicular to the rotation axis L1. The side surface opposite to the flat surface 11x has two ridges. Specifically, the side surface has a first ridge 11b1 on the blade edge 11a side, and a second ridge 11b2 on the inner side of the first ridge 11b1 in a radial direction of the disk-shaped upper blade 11. FIG. 4A is an enlarged plan view of the blade edge portion of the upper blade 11. In view of improved cutting performance and longer blade life, an angle (blade angle) α that the upper blade side surface between the blade edge 11a and the first ridge 11b1 forms with the flat surface 11x is preferably 20° or more and 45° or less.

From the viewpoint of making the upper blade 11 flexible, improving the cutting performance, and easing the contact pressure between the upper blade 11 and the lower blade 21 for extended blade life, an angle β that the upper blade side surface between the first ridge 11b1 and the second ridge 11b2 forms with the flat surface 11x is preferably smaller than the angle α, preferably 2° or more and 15° or less, and still further preferably 3° or more and 8° or less.

A distance h1 between the blade edge 11a and the first ridge 11b1 in the radial direction of the upper blade is preferably 0.13 mm or more and 0.40 mm or less. A distance h2 between the blade edge 11a and the second ridge 11b2 in the radial direction of the upper blade is preferably 0.4 mm or more and 7.6 mm or less.

Providing the upper blade 11 with the first ridge 11b1 and the second ridge 11b2 and shaping the upper blade 11 to be thinner on the blade edge 11a side can make the blade edge side of the flat blade flexible, and ease the contact pressure between the upper and lower blades like a cone blade. Moreover, the absence of a curved outer shape like that of the cone blade can improve the machining precision of the upper blade.

Figure 4B:
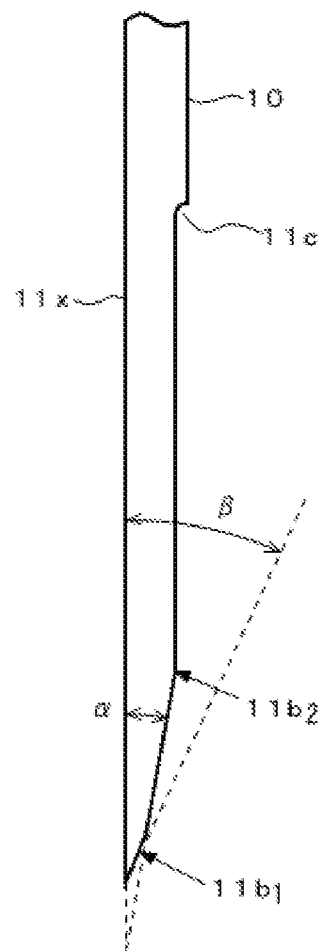
FIG. 4B is a plan view of the blade edge portion of the upper blade according to a modified aspect of the embodiment.

As shown in FIG. 4B, the upper blade 11 may have a step 11c on the inner side of the second ridge 11b2 in the radial direction of the upper blade 11 to make the blade edge side thinner as needed. This configuration can make the upper blade 11 more flexible.

The pitch p of the upper blades 11 is determined on the basis of the tape width needed for the tapes obtained by slitting the film 3. In the present invention, the upper limit may be 0.5 mm or less, preferably less than 0.5 mm, or 0.4 mm or less in particular, to accommodate narrow tapes. The lower limit is preferably 0.1 mm or more. If the upper blades 11 are shaped to have the foregoing two ridges 11b1 and 11b2, the pitch p of the upper blades 11 is set to 0.5 mm or less, preferably less than 0.5 mm, so that the film 3 or 30 can be slit to a width of 0.5 mm or less, preferably less than 0.5 mm.

The upper blade roller 10 on which the foregoing upper blades 11 are arranged at the pitch p can be obtained by forming and combining the upper blades 11 by cutting and polishing a metal material having excellent hardness and toughness, such as high speed steel, carbon steel, and stainless steel, using a precise cutting machine or the like. The used blades may be polished again for reuse.

<Lower Blades>

Figure 5A:
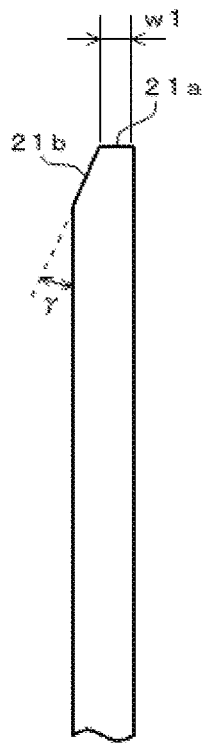
FIG. 5A is a plan view of the blade edge portion of a lower blade of the slitting device according to the embodiment.

The lower blades 21 can be similar to ones for conventional flat blade shear cutting. As shown in FIG. 5A, each lower blade 21 preferably has a flat-top blade edge 21a with a width w1 of 0.05 mm or more and 0.3 mm or less in view of avoiding breakage of the blade and maintaining the precision of the slit width to a certain level or higher. By contrast, an acute blade edge 21a makes shaving (galling) more likely to occur between blades. A surface 21b to face the blade surface of the upper blade 11 between the blade edge 11a and the first ridge 11b1 is preferably tilted. The tilt surface 21b preferably has a tilt angle γ of 15° or more and 45° or less.

Figure 5B:
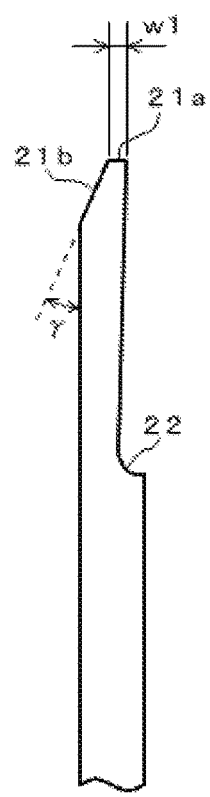
FIG. 5B is a plan view of a modified aspect of the blade edge portion of the lower blade of the slitting device according to the embodiment.

As shown in FIG. 5B, a step 22 may be provided to make the angle of the blade edge 21a acute. This can improve cutting performance.

<Assembly of Upper Blade Roller and Lower Blade Roller>

As shown in FIG. 3, the upper blade roller 10 and the lower blade roller 20 of the slitting device 1 are assembled with their rotation axes L1 and L2 in parallel so that an amount of overlap h4 between the upper blades 11 and the lower blades 21 is 0.05 mm or more and 0.5 mm or less.

The upper blade roller 10 and the lower blade roller 20 are preferably connected by gears and provided with a driving mechanism for rotating the rollers in the directions of the arrows in FIG. 1.

In addition, a side pressure mechanism for pressing the upper blades 11 against the lower blades 21 is preferably provided. For example, a device for mechanically pressing the flat surfaces of the upper blades against the side surfaces of the lower blades as described in Patent Literature 3 may be provided as the side pressure mechanism.

<Slitting Method>

A slitting method according to the present invention is a method for slitting a laminated film 30 including an adhesive layer 32 peelably laminated on a base film 31 by shear cutting using the upper blade roller 10 and the lower blade roller 20 described above to obtain laminated tapes having a width of 0.5 mm or less, preferably a width of less than 0.5 mm, and further more preferably 0.4 mm or less.

Figure 6A:
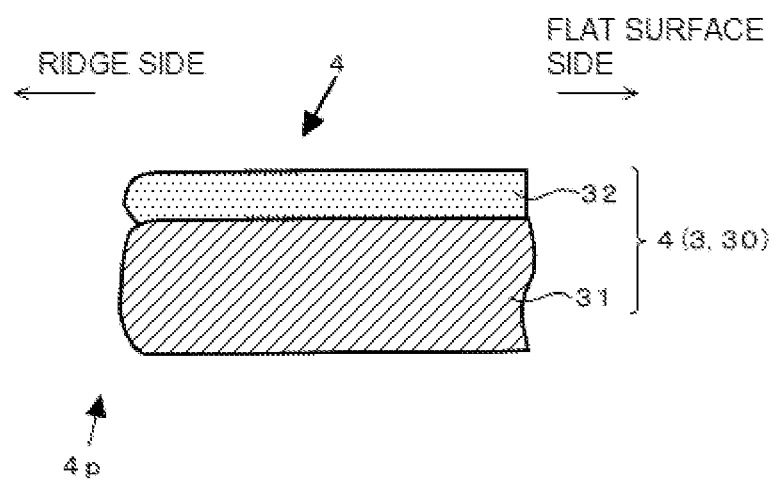
FIG. 6A is a cross-sectional view of a ridge-side end of a laminated tape typically obtained by slitting a laminated film with a conventional shear-cut slitting device after 400 m of slitting.
Figure 6B:
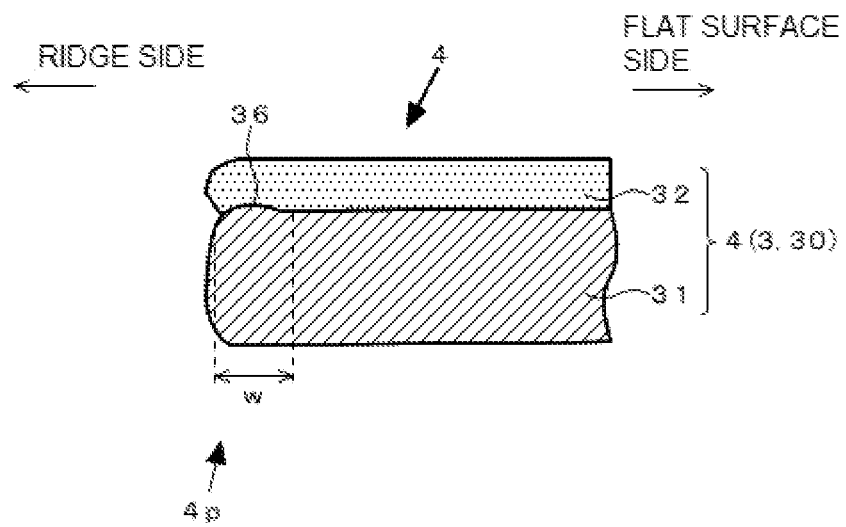
FIG. 6B is a cross-sectional view of a ridge-side end of a laminated tape typically obtained by slitting the laminated film with the conventional shear-cut slitting device after 50000 m or more of slitting.
Figure 7:
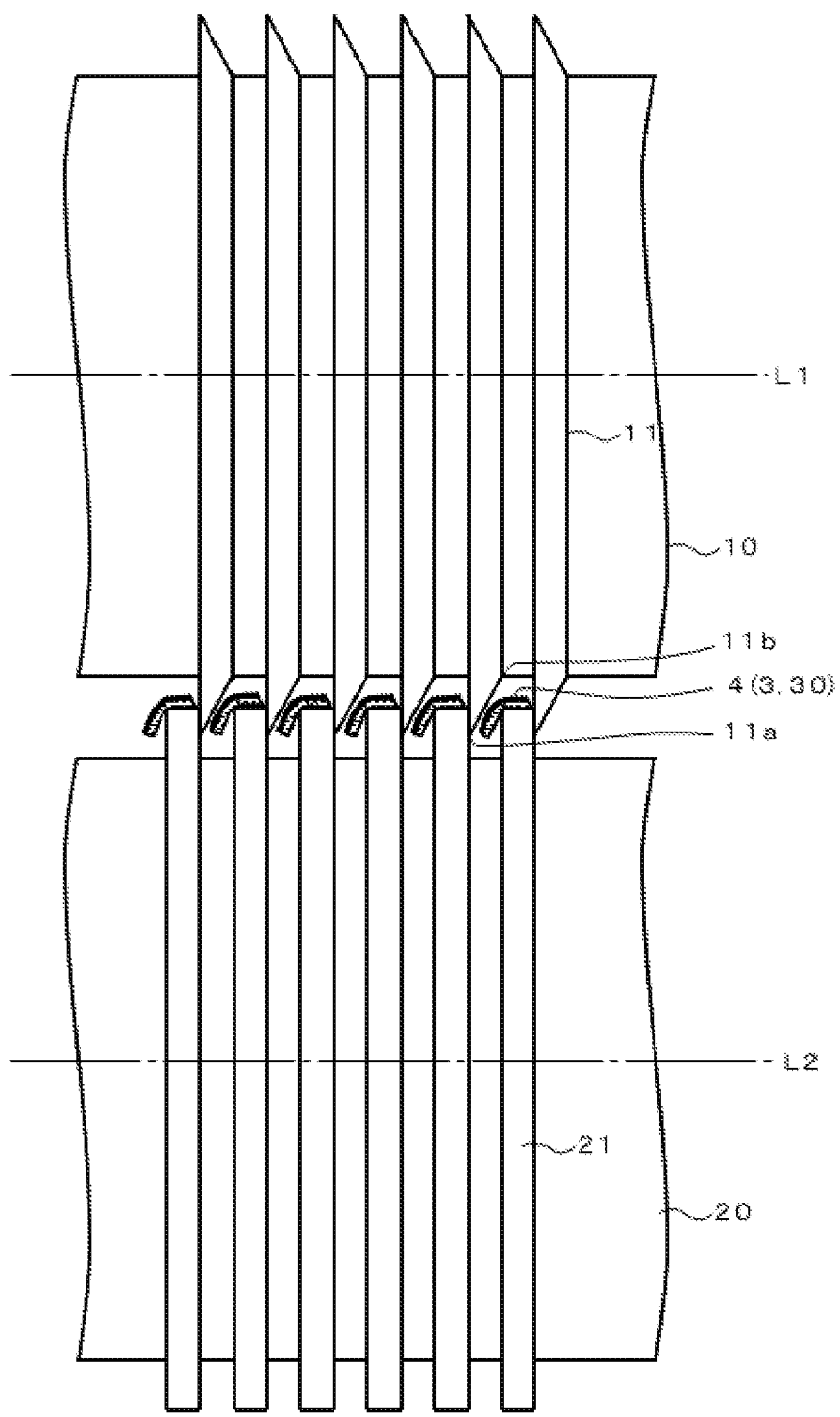
FIG. 7 is a front view of an upper blade roller and a lower blade roller of a shear-cut slitting device using conventional flat blades.
Figure 8:
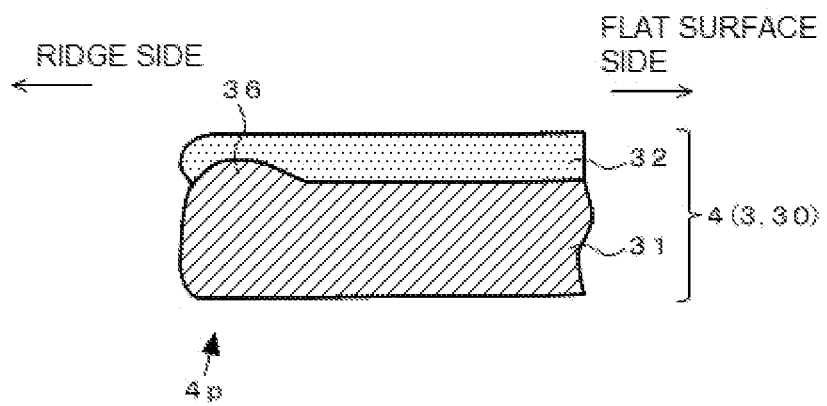
FIG. 8 is a cross-sectional view of a laminated tape obtained by slitting a film by shear cutting using the conventional flat blades.
Figure 9:
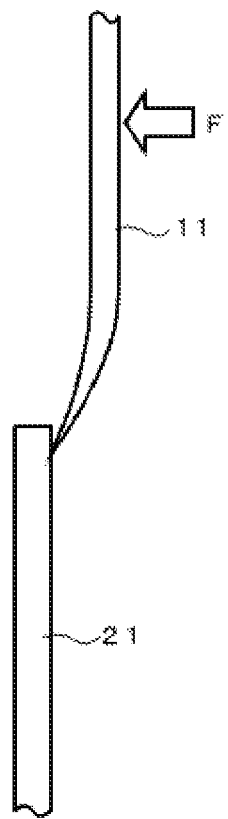
FIG. 9 is a front view of blade edge portions of a cone upper blade and a lower blade.

In general, in slitting a film with a shear-cut slitting device, the blade edges 11a are worn down and drop in cutting performance as the slitting length increases. This can result in the formation of bumps on the ridge-side ends of the slit tapes. For example, FIG. 6A and FIG. 6B are drawings of photographs (1000×) of the ridge-side end of the width-wise cross section of a tape obtained after a laminated film including a 10-μm-thick thermosetting resin laminated as an adhesive layer on a 50-μm-thick PET film was slit to a width of 1.5 mm by using the conventional shear-cut slitting device illustrated in FIG. 7. The drawing in FIG. 6A is a photograph obtained after slitting a length of 400 m while FIG. 6B is a photograph obtained after slitting a length of 50000 m or more. In the tape shown in FIG. 6B, the base film 31 has a bump 36 at the ridge-side end.

According to the slitting device of the present invention, long blade life is achieved compared to conventional slitting devices using cone blades. However, the blade edges are worn down as the slit length increases. In a production line for slitting laminated films, the slitting blades are preferably replaceable after slitting a predetermined length.

Even with the replacement of the slitting blades after a predetermined slit length, a bump 36 such as shown in FIG. 6B can occur between when the slitting blades start to be used and when they are replaced. More specifically, if a tape obtained by slitting after a laminated film is slit for a length of 100 m or more is cut in the tape width direction and the cut section is observed under an optical microscope, or the like with a magnification of 1000× or so, a bump 36 having a width w greater than 0% of the tape width is often found. There is, however, no practical problem as long as the width w of the bump 36 is equal to or less than 7% of the tape width. The width w is preferably 5% or less, more preferably 2% or less, and still further preferably 0% (in such a case, 0% refers to a state where no bump is found or a state where a deformation that cannot be definitely said to be a bump is found). In view of blocking suppression, the ratio of the height of the bump 36 to the film thickness of the base film is preferably 20% or less, and more preferably 10% or less. As the film width decreases, the adhesive layer becomes relatively more likely to be affected by the bump. This makes defects such as peeling from the base film and protrusion of the adhesive layer more likely to occur. The present invention meets the demand to solve such defects.

According to the slitting method of the present invention, the upper blades 11 or the upper and lower blades 11 and 21 may be replaced as appropriate so that the bump 36 has a width w of 7% or less of the tape width, preferably 5% or less, more preferably 2% or less, and particularly preferably 0%.

If the upper blades or the lower blades are thus replaced as appropriate and the tapes obtained by slitting the laminated film are formed into wound bodies having a tape length of 5 to 500 m, the frequency of occurrence of wound bodies having a bump 36 with a width w of greater than 0% and not greater than 7% of the tape width is 0.005% to 3%.

<Laminated Film>

Examples of the laminated film to be slit by the slitting method according to the present invention may include one obtained by peelably laminating a base film 31 having a thickness of 12 to 75 μm, or 25 to 75 μm in particular, an adhesive layer 32 having a thickness of 5 to 40 μm, or 5 to 25 μm in particular, and a cover film 33 thinner than the base film or having a thickness of 10 to 50 μm in order as shown in FIG. 2. As will be described below, the cover film may be omitted. The presence or absence of the cover film can be appropriately selected according to necessity. As employed herein, being peelable refers to that the base film 31 or the cover film 33 can be easily peeled off the adhesive layer 32 by attaching an adhesive cellophane tape to the base film 31 or the cover film 33 and peeling the adhesive cellophane tape, or by pinching an end of the base film 31 or the cover film 33 with film tweezers (hereinafter, tweezers) and peeling the base film 31 or the cover film 33.

The cover film 33 of the laminated film 30 may be located on the side where the upper blades 11 cut into during slitting. The base film 31 may be located on that side.

(Base Film, Cover Film)

The base film 31 may be a film formed of a thermoplastic resin such as polyethylene, polypropylene, or polyester like PET. The cover film 33 is provided to prevent contamination of the adhesive layer 32, and can be formed of the same material as that of the base film 31. The surfaces of the base film 31 and the cover film 33 are preferably subjected to a release treatment. The purpose is to enable separation from the adhesive layer. The cover film 33 is preferably more easily peelable than the base film 31 so that the cover film can be removed first after slitting. The wound bodies, the final form in which the laminated tapes are used as an adhesive member, may be either with the cover film for contamination prevention or without the cover film for improved workability.

In the present invention, the adhesive layer 32 having relatively low rigidity and the base film 31 having relatively high rigidity are simultaneously slit so as not to be separated during slitting. The adhesive layer 32 and the base film 31 can be peeled apart when the slit laminated tape is in use. Here, polyethylene, polypropylene, and polyester such as PET have a tensile modulus of approximately 1100 to 4200 MPa. When slitting the base film 31 formed of such a thermoplastic resin and the adhesive layer 32 having different rigidity than that of the base film 31 to a width of 0.5 mm or less at the same time, suppressing separation or peeling of the base film and the adhesive layer during the slitting is a technique of high difficulty. The present invention enables such slitting.

(Adhesive Layer)

The adhesive layer 32 may include a stack of adhesive films or a stack of pressure-sensitive adhesive coatings. Depending on the use of the tape obtained by slitting the laminated film 30, the adhesive layer 32 may include a single resin layer or a laminated or multilayered body of a plurality of resin layers. The adhesive layer 32 may contain a filler as needed.

(Adhesive Layer Filler)

If the adhesive layer contains a filler, the filler is appropriately selected from conventional inorganic fillers (metals, metal oxides, metal nitrides, etc.), organic fillers (resins, rubbers, etc.), fillers made of a mixture of organic and inorganic materials, and the like, depending on the use of the tape obtained by slitting the laminated film 30. For example, for optical applications and delustering applications, a silica filler, a titanium oxide filler, a styrene filler, an acrylic filler, a melamine filler, various titanates, or the like can be used. For capacitor film applications, titanium oxide, magnesium titanate, zinc titanate, bismuth titanate, lanthanum oxide, calcium titanate, strontium titanate, barium titanate, barium titanate zirconate, lead titanate zirconate, mixtures thereof, or the like can be used. For adhesive applications, the adhesive layer can contain polymer rubber particles, silicone rubber particles, or the like. For electronic parts mounting applications, the filler may be electrically conductive or insulative. If the filler is insulative, the filler can be used as a spacer.

The particle diameter of the filler can be determined on the basis of the use of the tape obtained by slitting the laminated film 30. For example, if the tape is used to mount electronic parts, the filler preferably has a particle diameter of 1 μm or more, and more preferably 2.5 μm or more and 30 μm or less.

As employed herein, the particle diameter refers to an average particle diameter. The average particle diameter can be determined from a plan image or cross-sectional image of the adhesive layer 32 of the laminated film 30. The average particle diameter of the filler material particles before the filler is mixed into the adhesive layer 32 of the laminated film 30 can be determined using a wet flow particle diameter and shape analyzer FPIA-3000 (manufactured by Malvern Panalytical). N number, the number of samples, is 1000 or more, preferably 2000 or more, and more preferably 5000 or more. Fillers having a particle diameter of less than 1 μm may be included. Examples of fillers having a particle diameter of less than 1 μm (so-called nanofillers) may include viscosity control fillers. This size can be determined by observation under an electron microscope (TEM, SEM). N number is preferably 200 or more.

Fillers having a functionality, such as quantum dots, may be included. The size of such fillers is not limited in particular, and is preferably 2 nm or more, and preferably 10 nm or more. This size can also be determined by observation under an electron microscope (TEM, SEM). N number is preferably 200 or more.

In the present invention, the filler to be described below refers to one having the foregoing particle diameter of 1 μm or more unless otherwise specified. In other words, nanofillers used as a surface modifier or filler are excluded.

The filler may be mixed and randomly dispersed in the resin of the adhesive layer, disposed out of contact with each other in a plan view, or regularly arranged to repeat a predetermined pattern in a plan view. The number density of the filler is appropriately adjusted in a range in which the film slitting is not affected. For example, the number density is 30 to 100000 particles/mm$^2$ in a plan view. The number density is preferably measured by observing the filler in the adhesive layer in a plan view under an optical microscope or a metallographic microscope, at ten or more points with a total region of 2 mm² or more and with a total number of filler particles of 200 or more.

(Resin Composition for Forming Adhesive Layer)

For the resin composition for forming the adhesive layer 32, one having tackiness or adhesiveness is appropriately selected according to a use of the tape obtained by slitting the laminated film 30, the presence or absence of the filler, etc. The adhesive layer 32 can be formed of a thermoplastic resin composition, a high-viscosity tacky resin composition, a curable resin composition, or the like. For example, if the tape is used as an adhesive member for such uses as mounting electronic parts, the resin composition for forming the adhesive layer may be a curable resin composition containing a polymerizable compound and a polymerization initiator, like the resin composition for forming the insulating resin layer described in WO 2018/074318 A1. The resin composition may be a so-called hot melt type adhesive member containing no curable resin composition.

A thermal polymerization initiator may be used as the polymerization initiator for the curable resin composition. A photopolymerization initiator may be used. Both the initiators may be used in combination. For example, a thermal cationic polymerization initiator is used as the thermal polymerization initiator, an epoxy resin as the thermo-polymerizable compound, a photoradical polymerization initiator as the photopolymerization initiator, and an acrylate compound as the photopolymerizable compound. A thermal anionic polymerization initiator may be used as the thermal polymerization initiator. A microcapsule-type latent curing agent prepared by covering the surfaces of modified imidazole cores with polyurethane is preferably used as the thermal anionic polymerization initiator.

The minimum melt viscosity of the entire adhesive layer formed of such an insulating resin composition is not limited in particular, and can be 100 Pa·s or more in view of film formation. To suppress useless filler flow in bonding the adhesive layer 32 to an article by thermocompression, the minimum melt viscosity is preferably 1500 Pa·s or more. Meanwhile, the upper limit of the minimum melt viscosity is not limited in particular. For example, the upper limit is preferably 15000 Pa·s or less, and more preferably 10000 Pa·s or less. The minimum melt viscosity can be determined, for example, by using a rotary rheometer (manufactured by TA Instruments) with a constant measurement pressure of 5 g and an 8-mm-diameter measurement plate. More specifically, the minimum melt viscosity can be determined in a temperature range of 30° C. to 200° C., at a temperature increase rate of 10° C./min, with a measurement frequency of 10 Hz and a load variation of 5 g with respect to the measurement plate. The minimum melt viscosity can be adjusted by changing the type and blending quantity of fine solid substances included as a melt viscosity modifier, and the preparation conditions of the resin composition.

(Adhesive Force of Adhesive Layer)

Peelability

The adhesive force of the adhesive layer 32 to the base film 31 and the cover film 33 can be weaker than that of the adhesive layer 32 to a predetermined article that the adhesive layer 32 is attached to depending on the application of the tape, allowing the base film 31 and the cover film 33 to be peeled off the adhesive layer 32. Typically, the peelability of the base film 31 is evaluated after the cover film 33 is first peeled off and the adhesive layer 32 is subsequently attached to the article. As described above, the base film 31 and the cover film 33 are peelable off the adhesive layer 32. This peelability refers to how the base film 31 and the cover film 33 can be easily peeled off the adhesive layer 32 by attaching an adhesive cellophane tape to the base film 31 or the cover film 33 and peeling the adhesive cellophane tape, or by pinching an end of the base film 31 or the cover film 33 with tweezers and peeling the base film 31 or the cover film 33. A specific criterion of peelability is an adhesive strength of 0.005 to 0.2 N when the unslit laminated film is cut into a 5-cm-wide 15-cm-long piece and a T-peel test (JIS K 6854) is performed thereon as a peel test. A 180° peel test or 90° peel test may be used for evaluation, depending on the material, thickness, and other properties of the base film 31. The cover film 33 is typically peeled off the base film 31 and the adhesive layer 32 first by using an adhesive cellophane tape. Next, the adhesive layer 32 is attached to the article, and then the base film 31 is peeled off with tweezers.

Stability

When the laminated film 30 is slit into a tape and the tape is wound up on a reel by a winding device to form a wound body, or when the wound body is loaded onto a connection device and the tape is pulled out of the wound body to be used as an adhesive member, the tape is subjected to tension (tensile force) in the long-side direction of the tape. The base film 31 and the adhesive layer 32 are preferably prevented from peeling when such tension acts on the tape. Specifically, a tape length conventionally desired of the wound body on the connection device is typically 5 m or more, and preferably 10 m or more. The tension acting on the tape being pulled out of the wound body in the long-side direction is typically around 1 to 5 N. Moreover, the reel can be locked and a tension of 5 to 6 N can act on the tape if a malfunction occurs while the connection device is in operation. That a load of around 5 N can act on the tape therefore needs to be taken into account. Therefore, the bonding state between the base film and the adhesive layer, as well as the connection of the reel and the base film (connection of a lead pulled out of the reel and the base film with an adhesive film such as a silicone tape or by ultrasonic welding) are preferably maintained even under such tension.

However, if the conventional tension is applied to a narrow tape, the base film can sometimes be broken or the base film and the adhesive layer can peel apart. In winding up or pulling out the narrow tape using existing equipment as much as possible, the tension acting on the tape in the long-side direction can therefore be set to around 0.5 N, and preferably less than 1 N. The upper limit is preferably 0.7 N or less, and more preferably 0.3 N or less.

From such practical requirements in enabling winding-up and pulling-out, the adhesive layer 32 needs to have stability so that the base film 31 and the cover film 33 do not peel off the adhesive layer 32 when a 1-m-long or longer piece, preferably a 5-m-long or longer piece, of the laminated tape slit to a width of 0.1 mm or more and 0.5 mm or less by the method of the present invention is subjected to a tensile force of 0.5 N or more, preferably 1 N, more preferably 5 N, in the long-side direction. While the foregoing peelability is a property related to the upper limit of the adhesive force of the adhesive layer 32 to the base film 31 and the cover film 33, this stability is a property related to the lower limit of the adhesive force.

Stability tests are preferably performed in a simplified manner. In one test method, the test length of the laminated tape is 1 m. A laminated tape cut into the test length of 1 m is fixed at one end, while a load of 0.5 N, preferably 1 N, or more preferably 5 N, is applied to the other end, and the presence or absence of peeling between the base film 31 and the adhesive layer 32 is observed. In a more practical test method, the tape is pulled out of the wound body by 1 m or more, and the presence or absence of peeling is observed with a load of 0.3 N, 0.5 N, 1 N, or 5 N applied to the end of the tape. Alternatively, the entire length of tape may be pulled out of the wound body, and the presence or absence of peeling may be observed at 20 points or more, preferably 50 points or more, at random. Examples of the criteria of the adhesive force needed for practical use in such a test may include the following: (i) The base film does not peel off the adhesive layer if the laminated film is slit into a laminated tape having a width of 0.1 mm or more and 0.5 mm or less by the method of the present invention, the tape including the adhesive layer and the base film is wound into a tape wound body with the cover film removed, one meter of tape is pulled out of the wound body and the joint position between the winding core of a reel and the tape is fixed, and a tension of 0.3 N, preferably 0.5 N, more preferably 1 N, or still further preferably 5 N, is applied as a static load to the tape end with a joint position angle of α (Japanese Patent Application Laid-Open No. 2017-137188) of 90°, and no protrusion occurs affecting the pulling-out; (ii) the base film 31 does not peel off the adhesive layer 32 if a specimen having a test length of 1 m is freely cut out of the laminated tape into which the laminated film is slit to a width of 0.1 mm or more and 0.5 mm or less by the method of the present invention, and a tensile force of 0.5 N, preferably 1 N, or more preferably 5 N, is applied to the specimen in the long-side direction; and (iii) no peeling of the adhesive layer and the base film is visually confirmed over the entire length of the tape (details will be described in an embodiment to be described below) when the entire tape including the adhesive layer and the base film is manually pulled out of a wound body, which consists of 5 m or more tape wound around a winding core with 0.5 N. In view of simplified testing, the method (iii) is preferable. The absence of peeling between the base film and the adhesive layer may be confirmed by cutting the tape into a test length of around 1 m and manually applying a load (approximately 1 N to 5 N) to both ends.

Suppose that the laminated tape having the foregoing adhesive force is wound into a wound body of preferably 5 m or more, 10 m or more, 50 m or more, or 100 m or more in length, and the tape is pulled out of the wound body preferably by 1 m or more, and more preferably 5 m or more. Even in such a case, the peeling of the base film 31 of the pulled-out tape off of the adhesive layer 32 can be prevented. Such a tape can be put to practical use in mounting electronic parts.

Adhesive Force to Object to be Connected

As a method for testing the required adhesive force of the adhesive layer to an object to be connected such as an electronic part and a substrate, a peel test may be performed in which a freely sampled 2-cm-long small piece of the laminated tape (small piece cut out of the 1-m specimen of the laminated tape according to the foregoing method (ii) may be used) is temporarily bonded to a plain glass (for example, bonded at 45° C.) with the adhesive layer in contact with the plain glass, and only an end of the base film 31 (or cover film 33) is pinched with tweezers to remove the base film 31 (or cover film 33). The peel test is determined to be successful if only the base film 31 (or cover film 33) can be removed and the adhesive layer remains bonded to the plain glass without a change in shape. This peel test preferably succeeds at a rate of 75% or more, more preferably 80% or more, still further preferably 90% or more, with N, the number of samples, at 20 or more.

(Bonding of Joint Tape)

A joint tape may be bonded to the laminated film 30 to attach a lead to the laminated film 30 at the beginning of winding or unwinding of a wound body, or to bond a first laminated film and a second laminated film together for extension. The joint tape and the laminated film 30 can be joined at a plurality of locations regularly or at random. The lead can be attached to the laminated film by joining the base film 31 of the laminated film 30 and the lead together with a joint tape. The lead may be attached to the laminated film by a conventional method such as ultrasonic welding.

A highly peelable adhesive tape with a base material, having a relatively small total thickness (such as a silicone tape) can be used as the joint tape. The laminated film and the lead can be joined at a plurality of locations regularly or at random. The thickness of the joint tape is not limited in particular, and may be 5 to 75 μm, for example.

In slitting the portion of the laminated film 30 where the joint tape is bonded, the upper blades 11 cut deeply into the stack of the laminated film 30 and the joint tape. With a conventional slitting device, the surface of the stack where the upper blades 11 cut into therefore undergoes a high compressive force from the side surfaces of the upper blades 11 due to extremely small distances between adjoining blades, compared to the opposite surface. The cover film 33 or the base film 31 is thus likely to peel off the adhesive layer 32, or the adhesive layer 32 is likely to protrude from the side surfaces of the slit stack. In contrast, according to the present invention, the upper blades 11 have two ridges and the tips of the upper blades 11 are thinner than those of the conventional flat blades. This can prevent the stack of the laminated tape 30 and the joint tape from undergoing a high compressive force from the side surfaces of the upper blades 11 even if the upper blades 11 cut deeply into the stack. Peeling of the cover film 33 or the base film 31 off the adhesive layer 32 and the protrusion of the adhesive layer 32 from the wound body can thus be suppressed despite the bonding of the joint tape to the laminated film 30. Compared to wide tapes, narrow tapes are subjected to a relatively large force per tape cross-sectional area in the slit width direction, and are more likely to cause protrusion of the adhesive layer. The difficultly of preventing the protrusion of the adhesive layer 32 can thus be said to increase as the tape width decreases. Similarly, the difficulty of preventing bumps also increases as the tape width decreases.

<Laminated Tape>

The laminated tape according to the present invention is a tape obtained by slitting the laminated film 30 by the foregoing slitting method. Therefore, this tape is a laminated tape including the adhesive layer peelably laminated on the base film. The upper limit of the tape width is 0.5 mm or less, preferably less than 0.5 mm, and still further preferably 0.4 mm or less. The lower limit is 0.1 mm or more, preferably 0.2 mm or more, and more preferably 0.25 mm or more.

The base film 31 of this laminated film is prevented from forming a bump at one end in the tape width direction. If the base film 31 has any bump 36, the width of the bump in the tape width direction is 7% or less of the tape width, preferably 5% or less, and still further preferably 2% or less, which poses no practical problem. If a plurality of wound bodies (also referred to as reel products) are manufactured from the laminated tape, it is preferable that the foregoing bump formation be prevented not just in one of the wound bodies, but in all the other wound bodies manufactured from the laminated tape at the same time (so-called rolls in the same lot) and similar wound bodies manufactured at different times (wound bodies in different lots). The present invention can prevent such defects as peeling and protrusion in all the wound bodies belonging to the same lot and even all the wound bodies belonging to different lots.

The laminated tape is characterized in that the base film and the adhesive layer do not peel apart if a specimen freely cut out of the tape to a test length of 1 m is fixed at one end and a tensile force of 0.5 N or 1 N is applied to the other end, and that the adhesive layer 32 does not protrude from the wound body. The laminated tape also satisfies practical requirements that the adhesive layer not peel off a plain glass and only the base film or the cover film 33 be removed if the tape is cut into a 2-cm-long small piece, the adhesive layer is bonded to the plain glass, and only an end of the base film 31 or the cover film 33 is pinched with tweezers to remove the base film 31 or the cover film 33. The laminated tape thus enables so-called bonding and transfer.

In view of handleability, the tape is preferably formed into a wound body. In view of practical use, the wound body preferably has a tape length of 5 m or more and 5000 m or less, more preferably 50 m or more and 1000 m or less, and still more preferably 500 m or less. Typically, the smaller the tape width becomes, the more likely the wound body is to cause blocking. According to the laminated tape of the present invention, the wound body is less likely to cause blocking, and even if the laminated tape is pulled out of the wound body by 5 m or more, no peeling occurs between the base film 31 or cover film 33 and the adhesive layer 32 of the laminated tape pulled out.

In general, a laminated tape obtained by slitting a laminated film can sometimes cause a visual lift (discolored portion) at the edges that are the slit sections. With a tape width of 0.5 mm or less, lifts at both edges of the laminated tape can cause useless peeling of the base film and the adhesive layer. However, according to the present invention, the laminated film is slit with sharp double-ridged flat blades. Lifts are therefore less likely to be observed if the entire length of tape forming a wound body is visually observed for a lift at freely-selected 20 points or more, preferably 50 points or more. A lift, if any found at an edge along a slit section of the laminated tape, has only a length of less than 5 cm and a width of 40% or less, or ⅓ or less in particular, of the tape width, whereby peeling of the base film and the adhesive layer can be suppressed.

As described above, according to the laminated tape of the present invention, the base film and the adhesive layer are less likely to deviate from each other, and blocking and a lift are less likely to occur. This improves the workability in winding a wound body and pulling the tape out of the wound body, and the cut piece of the tape pulled out of the wound body can be attached to a target member without much deviation in the attached position. The laminated tape according to the present invention can thus be used for various applications as a narrow pressure-sensitive adhesive member or an adhesive member. In such a case, the type and the like of the resin composition constituting the adhesive layer 32 are selected as appropriate according to the target member for the tape to be bonded to.

Embodiment

A laminated film including a base film formed of a 38-μm-thick release-treated PET film and an adhesive layer formed of a 10-μm-thick acrylic thermosetting resin (adhesive film, manufactured by Dexerials Corporation) was slit into 0.4-mm-wide 100-m-long tapes by a single operation of shear cutting, using an upper blade roller where upper blades having the shape shown in FIG. 4A were arranged at a pitch p of 0.4 mm and a lower blade roller where lower blades having the shape shown in FIG. 5A were arranged. The tapes were wound up around ϕ-90-mm flanged winding cores (flange-to-flange distance of 0.5 mm) with a tensile force of 0.3 to 0.7 N to form wound bodies. The blades were sharpened for each slitting operation, and wound bodies of a cumulative total tape length of 1000 m were obtained. The obtained wound bodies were subjected to the following evaluations.

(1) Bump

The 0.4-mm-wide tapes obtained by the slitting were cut with a knife in the tape width direction at positions of 800 m, 900 m, and 1000 m in total slit length. The sections were observed under an optical microscope (1000×), and no bump was found in the base film.

(2) Lift

The entire 100-m tape was manually pulled out of a wound body. No peeling of the adhesive layer and the base film was found over the entire length. There was no protrusion of the adhesive layer, either. No adhesion of the adhesive layer to the flanges was found, either. Twenty 10-cm-long test regions of the pulled-out tape at freely-selected positions were visually observed and evaluated with reference to the following criteria based on the following items a, b, and c related to the presence or absence of a lift.

a: no lift of 5 cm or more in length
    b: no lift with a width greater than ⅓ of the tape width
    c: no more than five lifts of less than 5 cm in length or with a width of ⅓ or less the tape width
    Rank A: all items a, b, and c were satisfied
    Rank B: both the items a and b were satisfied
    Rank C: other than the foregoing ranks A and B The evaluation result was rank A. There is no practical problem if rank B is satisfied. Item c is preferably satisfied as well. During the manual pulling, there occurred no protrusion of the adhesive layer that interfered with workability. No adhesion of the adhesive layer to the flanges was found, either.

(3) Peel Test, Protrusion (Blocking)

A 5-m-long tape was pulled out of a wound body. The tape was fixed at one end, and left suspended at 35° C. for six hours with a weight of 50 g (0.5 N) on the other end. The suspended tape was then visually observed for peeling of the base film and the adhesive layer and the presence or absence of a lift.

As a result, no peeling of the base film and the adhesive layer occurred. No lift was found, either. There was no protrusion of the adhesive layer that interfered with the pulling of the tape out of the wound body. In other words, there was neither protrusion nor blocking described as in Japanese Patent Application Laid-Open No. 2017-137188. The same result was obtained with a length of 1 m.

(4) Adhesiveness Test

Twenty 2-cm-length tapes were freely cut out of a wound body. The cover films were peeled and removed from the tapes, and the adhesive layers were bonded to a plain glass (float glass plate) on an electric griddle (45° C.). The base film at one end of the surface of each tape was then pinched with tweezers, and whether the adhesive layer remained bonded to the plain glass was visually observed.

As a result, twenty out of the twenty adhesive layers successfully fully remained on the plain glass.

The foregoing test results (1) to (4) are not limited to the case where the base film has a thickness of 38 μm, and the base film may be made thicker or thinner by adjusting the conditions.

REFERENCE SIGNS LIST 1 slitting device
2 film unwinding device 3 film
4, 4a, 4b tape
4p tape end on ridge side
5 splicing unit
7a, 7b, 7c winding device
10 upper blade roller
11 upper blade
11a blade edge
11b ridge
11b1 first ridge
11b2 second ridge
11c step
11x flat surface
20 lower blade roller
21 lower blade
21a blade edge
21b surface
22 step
30 laminated film
31 base film
32 adhesive layer
33 cover film
36 bump
α blade angle of upper blade
F side pressure, compressive force
h1 distance between first ridge and blade edge in radial direction of upper blade
h2 distance between second ridge and blade edge in radial direction of upper blade
h4 overlap between upper blade and lower blade
L1, L2 rotation axis
p pitch of upper blades
w width of bump
w1 width of blade edge of lower blade
γ tilt angle
β angle

The invention claimed is:

1. A blade roller comprising a plurality of disk-shaped upper blades, the upper blades being arranged at a predetermined pitch relative to one another on the blade roller, wherein each upper blade includes:
a first side surface that is a flat surface and includes a blade edge of the corresponding upper blade;
a second side surface that has a first ridge and a second ridge; and
a third side surface that is between the blade edge and the first ridge, wherein:
a pitch of the upper blades is 0.5 mm or less,
an angle between the first side surface and the third side surface is 20° or more and 45° or less,
an angle between the first side surface and the second side surface is 2° or more and 15° or less,
a distance between the blade edge and the first ridge in a radial direction of the upper blade is 0.13 mm or more and 0.40 mm or less, and
a distance between the blade edge and the second ridge in the radial direction of the upper blade is 0.4 mm or more and 7.6 mm or less.

2. The blade roller according to claim 1, wherein the pitch of the upper blades is 0.1 mm or more and 0.4 mm or less.

3. A slitting device comprising: the blade roller according to claim 1 as an upper blade roller; and a lower blade roller including lower blades arranged at the predetermined pitch to correspond to the upper blades of the upper blade roller, the slitting device being configured to slit a film to a width of 0.5 mm or less by shear cutting.

4. A slitting method for slitting a laminated film including an adhesive layer peelably laminated on a base film into a laminated tape having a tape width of 0.5 mm or less by shear cutting using the upper blade roller according to claim 1 and a lower blade roller including lower blades arranged at the predetermined pitch to correspond to the upper blades of the upper blade roller.

5. The slitting method according to claim 4, wherein the laminated film is obtained by bonding a first laminated film and a second laminated film with a joint tape.

* * * * *